(12) United States Patent
Hicks et al.

(10) Patent No.: US 12,475,025 B2
(45) Date of Patent: Nov. 18, 2025

(54) IDENTIFICATION OF RELATED TEST CASES AND OVERLAPPING CODE UNDER TEST

(71) Applicant: International Business Machines Corporation, Armonk, NY (US)

(72) Inventors: Andrew C. M. Hicks, Highland, NY (US); Michael Terrence Cohoon, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 18/509,564

(22) Filed: Nov. 15, 2023

(65) Prior Publication Data

US 2025/0156304 A1 May 15, 2025

(51) Int. Cl.
*G06F 11/3668* (2025.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 7,596,778 | B2* | 9/2009 | Kolawa | G06F 11/3688 714/38.14 |
| 9,053,228 | B1* | 6/2015 | Bienkowski | G06F 11/3698 |
| 9,690,553 | B1* | 6/2017 | Brodie | G06F 8/71 |
| 10,922,217 | B1 | 2/2021 | Levi et al. | |
| 11,288,174 | B2 | 3/2022 | Levi et al. | |
| 11,474,932 | B2* | 10/2022 | Ramraz | G06F 11/3684 |
| 12,271,293 | B1* | 4/2025 | Chauhan | G06F 11/3688 |
| 2010/0287534 | A1 | 11/2010 | Vangala et al. | |
| 2011/0145793 | A1* | 6/2011 | Alexander | G06F 11/3676 717/124 |
| 2014/0115565 | A1* | 4/2014 | Abraham | G06F 11/368 717/131 |
| 2017/0371304 | A1* | 12/2017 | Gupta | F16P 3/00 |
| 2020/0192789 | A1* | 6/2020 | Peng | G06F 16/904 |
| 2025/0036554 | A1* | 1/2025 | Bakshi | G06F 11/3688 |
| 2025/0278532 | A1* | 9/2025 | Bolchover | E21B 44/00 |

FOREIGN PATENT DOCUMENTS

| | | | | |
|---|---|---|---|---|
| CN | 100568179 | C | 12/2009 | |
| CN | 112256566 | A | 1/2021 | |
| CN | 118051421 | A * | 5/2024 | G06F 8/41 |
| CN | 119357060 | A * | 1/2025 | G06F 8/41 |
| CN | 119917421 | A | 5/2025 | |
| EP | 3719653 | B1 * | 3/2022 | G06Q 50/20 |
| JP | 5516277 | B2 | 6/2014 | |

* cited by examiner

*Primary Examiner* — Philip Wang
*Assistant Examiner* — Rongfa P Wang
(74) *Attorney, Agent, or Firm* — Patterson + Sheridan, LLP

(57) ABSTRACT

Method and apparatus for system testing. A code base is accessed. A first section of the code base that is explicitly covered by a first test case is identified. A second section of the code base is modified, where the second section is not explicitly covered by the first test case. The first test case is executed on the code base with the modification of the second section of the code base. Based on determining that the execution of the first test case fails, the second section of the code base is determined to be implicitly covered by the first test case.

20 Claims, 7 Drawing Sheets

305 //Function to read data from a disk
function read_data_from_disk():
...

315 //Function to initialize a tape drive, setting it up
for read/write operations
function initialize_tape_drive():
...

320 //Function to write data to a tape drive
function write_to_tape_drive(data):
tape_drive.write(data)

325 //Function to read data from the tape drive
function read_from_tape_drive():
return tape_drive.read()

330

310

335 //Function to set up test environment
function setup():
data = read_data_from_disk()
initialize_tape_drive()
return data 340 //Function to verify the correctness of the
write_to_tape_drive function
function verify_tape_drive_write(data):
tape_data = read_from_tape_drive()
assert tape_data = data 345 //Main test function
function main_test():
data = setup()
write_to_tape_drive(data)
verify_tape_drive_write(data)

IDENTIFICATION OF RELATED TEST CASES AND OVERLAPPING CODE UNDER TEST

BACKGROUND

The present disclosure relates to system testing, and more specifically, to identifying related test cases based on overlapping code under test.

Computer and software systems are often highly complex, with many parts of the system working together to achieve the desired results. To ensure the quality and validity of these systems, test cases are written to check that each piece of the system is working as intended. These test cases can be automatically generated or created by human testers. The range of test cases is very broad, from isolated unit tests that examine the behavior of the smallest functions, to acceptance tests that evaluate the integration of multiple components, middleware, and applications simultaneously under high stress. Such thorough testing ensures that computer systems perform stably and reliably in different situations.

However, with the increasing number of test cases, challenges arise. For example, with an overwhelming number of scenarios to consider, testing can become time-consuming and demand significant resources. Additionally, without a clear testing strategy, the test process may overlook some important scenarios, even when executing an excessive number of test cases. Further, as systems change over time, some test cases become useless (e.g., the code they tested is no longer used) and/or some code goes untested (e.g., no test cases exist to evaluate the new code). Therefore, more efficient and streamlined testing strategies are needed to ensure both comprehensive coverage and optimal use of resources.

SUMMARY

One embodiment presented in this disclosure provides a method, including accessing a code base, identifying a first section of the code base that is explicitly covered by a first test case, modifying a second section of the code base, where the second section is not explicitly covered by the first test case, executing the first test case on the code base with the modification of the second section of the code base, and determining that the second section of the code base is implicitly covered by the first test case based on determining that the execution of the first test case fails.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs that, when executed by the one or more computer processors, perform an operation in accordance with one or more of the above methods.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 depicts an example code for test coverage identification, according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DETAILED DESCRIPTION

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present disclosure provide techniques and methods to determine the relationships between test cases by analyzing the extent of overlapping code segments driven by each test case. By examining the specific segments of code (or code paths) that each individual test case drives within a code base, the disclosed techniques can enable identification of both the explicit and implicit test coverage for each test case. The explicit test coverage includes the primary segments of code a test case is intentionally designed to evaluate. In contrast, the implicit test coverage refers to additional components, modules, or segments of code that are executed during the test in order to perform the test, but which are not the primary focus the test case was designed to drive. Relying on the identified test coverage for each test case, the method can further prioritize and categorize test cases. Additionally, the method can optimize and streamline test strategies to reduce redundancy and ensure that important sections of the computer or software system are tested properly and efficiently.

Figure 1:
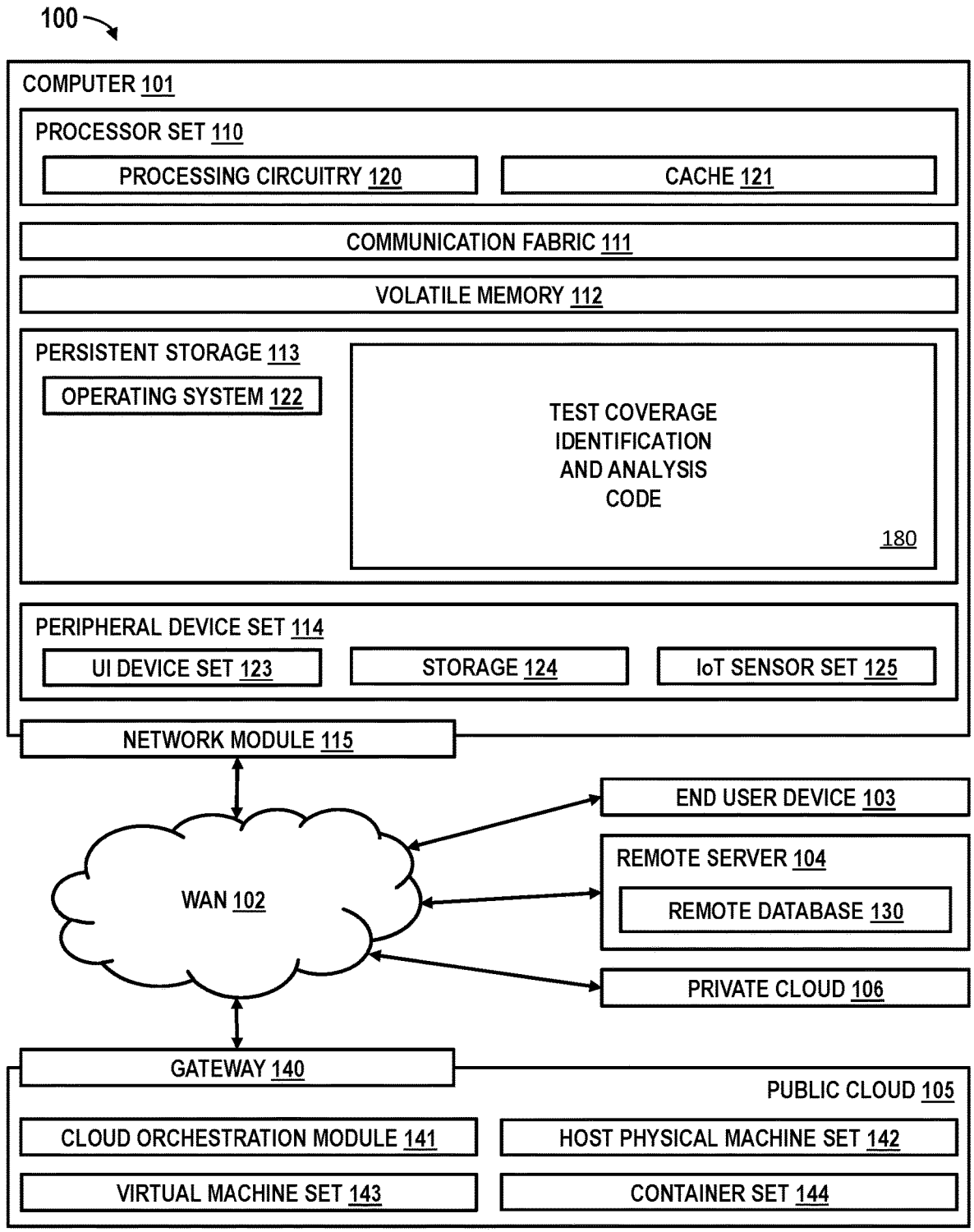
FIG. 1 depicts an example computing environment for the execution of at least some of the computer code involved in performing the inventive methods.

FIG. 1 depicts an example computing environment for the execution of at least some of the computer code involved in performing the inventive methods.

Computing environment 100 contains an example of an environment for the execution of at least some of the computer code involved in performing the inventive methods, such as Related Test Cases Identification and Analysis Code 180. In addition to Related Test Cases Identification and Analysis Code 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Related Test Cases Identification and Analysis Code 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Related Test Cases Identification and Analysis Code 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Related Test Cases Identification and Analysis Code 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
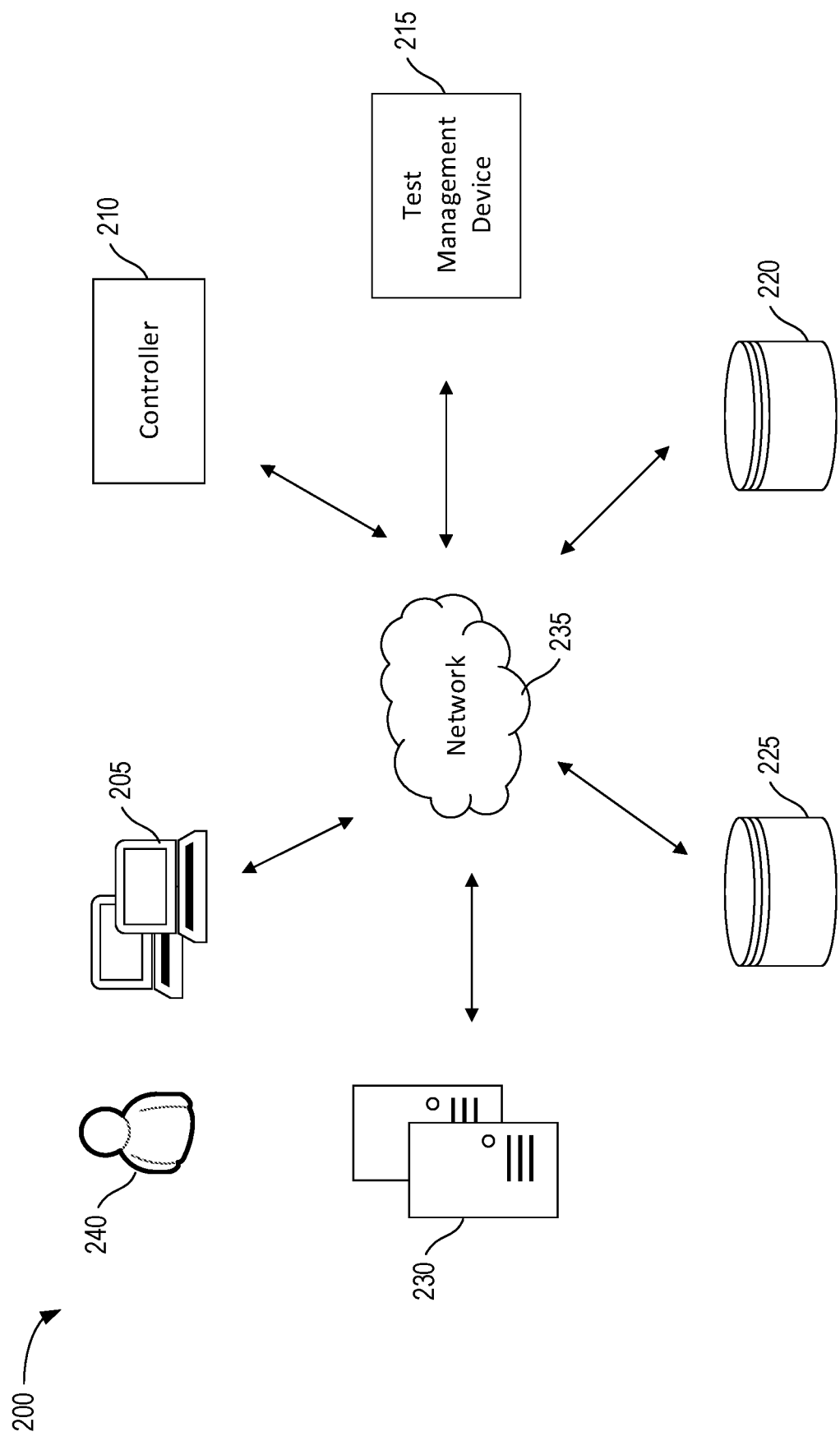
FIG. 2 depicts an example environment in which embodiments of the present disclosure may be implemented.

FIG. 2 depicts an example environment 200 in which embodiments of the present disclosure may be implemented.

In the illustrated example, the environment 200 includes one or more client devices 205, one or more test servers 230, a controller 210, a test management device 215, a test database 220, and a source code database 225. In some embodiments, one or more of the illustrated devices may be a physical device or system. In other embodiments, one or more of the illustrated devices may be implemented using virtual devices, and/or across a number of devices.

In the illustrated example, the client devices 205, the test servers 230, the controller 210, the test management device 215, the test database 220, and the source code database 225 are remote from each other and communicate with each other via a network 235. Each of the devices may be implemented using discrete hardware systems. The network 235 may include or correspond to a wide area network (WAN), a local area network (LAN), the Internet, an intranet, or any combination of suitable communication mediums that may be available, and may include wired, wireless, or a combination of wired and wireless links. In some embodiments, each of the devices may be local to each other (e.g., within the same local network and/or the same hardware system), and communicate with one another using any appropriate local communication medium.

In the illustrated example, the client devices 205 are accessed by human testers 240. In some embodiments, the client devices 205 may serve as the main access point for human testers to interact with the test management device 215, the test servers 230, the test database 220, the source code database 225, and other testing systems. In some embodiments, a tester 240 may use the client devices 205 to design test cases, which involves defining test scenarios, setting up test data, and writing test scripts/code. In some embodiments, the tester 240 may use the client devices 205 to initiate test execution and manage the testing process. For example, the tester 240, via the client devices 205, may send commands to the test management device to start, stop, or manage test executions. In some embodiments, the tester 240, via the client devices 205, may start manual test sessions. After test execution, the tester 240 may review testing results and identify defects or anomalies via the client devices 205. In some embodiments, the client devices 205 may include some integrated tools that can automatically (or at least with reduced human inputs) generate test cases based on certain criteria.

In the illustrated example, the controller 210 may communicate with the client devices 205 and the test management device 215 via the network 235. In some embodiments, the controller 210 may receive commands from the client devices 205 and/or the test management device 215 to initiate, stop, or coordinate the execution of test cases on the test servers 230. In some embodiments, when multiple client devices 205 are interacting with multiple test servers 230, the controller may coordinate the test execution, to ensure that tests are distributed appropriately across multiple test servers 230. The coordination of test execution may avoid conflicts or resource contentions, and provide efficient utilization of available test servers 230.

In the illustrated example, the test management device 215 is coupled to the other testing components via the network 235. In some embodiments, the test management device 215 may send commands to the controller 210 to trigger or halt test execution. In some embodiments, the commands may be generated based on direct inputs from testers 240 using the client devices 205. In some embodiments, the commands may be automated triggers set by the test management device 215. In some embodiments, the automated triggers to start test runs (on a remote test server 230) may be set based on predefined time intervals (also referred to in some embodiments as time-based scheduling), such as daily, weekly, or monthly, to ensure consistent validation of the existing functionalities of a software or application system. In some embodiments, test runs (on a remote test server 230) may be triggered by specific events (also referred to in some embodiments as event-based scheduling). For example, a new test run may be scheduled and/or initiated to re-execute the test cases upon determining there are modifications to the source code (also referred to in some embodiments as the code base). The re-execution ensures that the software system remains robust and reliable after every code change.

In one embodiment, the test management device 215 may identify explicit and implicit test coverage for each test case. For example, in some embodiments, the implicit test coverage may be identified by intentionally changing certain sections of the code base, rerunning the test case, and observing if the test case still passes. For example, sections of code may be modified to introduce intentional errors, or to otherwise disrupt or prevent normal operation (e.g., to block a section of code from returning output). If changes or errors introduced into other components, modules, or code segments outside the sections of code (or code paths) that the test case was explicitly designed to evaluate, and the test case fails to pass as a result of such changes, this may indicate that these external sections are implicitly driven by the test case. That is, although the code was not the intended target of the test, the code was nevertheless used during performance of the test. In some embodiments, therefore, such code may be determined to be implicitly covered by the test (e.g., the code is part of the implicit test coverage of the test case).

For example, suppose a test case is designed to determine whether a function accurately computes the sum of two numbers (also referred to in some embodiments as a "compute_sum" function). As part of the test, the function involves two other functions, one that reads the numbers from the system memory (also referred to in some embodiments as a "read_from_memory" function), and another that writes the resultant sum back into the memory (also referred to in some embodiments as a "write_to_memory" function). If the "read_from_memory" function is intentionally modified to, for example, read a wrong number, or block access by the "compute_sum" function, the test case will fail, even though its primary intent was to cover the "comput_sum" function and not necessarily the memory read/write functions. Therefore, the memory read/write functions are implicitly driven by the test case.

In one embodiment, the test management device 215 may compare the explicit and implicit sections of code driven by a test case to those of other test cases. Based on the comparison results, the test management device 215 may identify overlaps in test coverage between different test cases, and may determine the degree of relatedness between these test cases. In some embodiments, the test management device 215 may generate a score to represent the extent of overlap in test coverage between two different test cases. A higher overlap in test coverage may lead to a higher relatedness score. The score may then be compared with one or more defined thresholds. If the score exceeds (or is equal to) a defined threshold, the test management device 215 may categorize the two test cases as related. Otherwise, if the score falls below the threshold, the two test cases may be determined to be unrelated. In some embodiments, the test management device 215 may instruct the test database 220 to store various data, including test results and the relationship between different test cases.

In some embodiments, the source code database 225 may store source code for a computer or application system. In some embodiments, the collection of source code files and related assets may be referred to as the code base. In some embodiments, the source code database 225 may further track changes and maintain a version history of the source code. In some embodiments, the test management device 215 may monitor modifications or changes to the system's code base by continuously interacting with the source code database 225. Upon detecting changes, the test management device 215 may schedule new test runs on the test servers 230, reexamine the relatedness between different test cases, and/or update the test database 220 when the original relationships change.

FIG. 3 depicts an example code 300 for test coverage identification, according to some embodiments of the present disclosure.

In the illustrated diagram, the example code 300 includes two parts, the source code 305 and the test code 310. The depicted source code 305 is extracted from the code base, and only represents a portion of the entire code base. The depicted source code 305 provides core functionalities when the software system interacts with a tape drive and/or a disk (e.g., reading data from a disk, initializing a tape drive, writing data to a tape drive, and reading data from a tape drive). The test code 310 is written for a test case, which is specifically designed to verify that data can be correctly written to a tape drive. In the illustrated diagram, both the source code 305 and test code 310 are illustrated in pseudocode format for conceptual clarity. In some embodiments, the source code 305 and test code 310 may be written in various programming languages, such as Java, Python, C++, or others, depending on the requirements of the system and its development environment.

In the illustrated diagram, the source code 305 includes four core functions for different tasks, such as a core function to read data from a disk 315, a core function to initialize a tape drive 320, a core function to write data to a tape drive 325, and a core function to read data from a tape drive 330. The test code 310 is designed to verify whether data can be correctly written to a tape drive and includes three functions: a function to set up the test environment 335, which relies on the "read_data_from_disk" function 315 to fetch the data intended for writing to a tape drive; a function to verify the correctness of the writing operation, which relies on the "read_from_tape_drive" function 330 to retrieve the data saved in the tape drive; and a main test function 345, which defines the entire test sequences and calls specific operations (e.g., "write_to_tape_drive" function 325 and "verify_tape_drive_write" function 340) to conduct the test.

Although the test case is designed to validate the "write_to_tape_drive" function 325, it may inadvertently drive the code paths for the "read_data_from_disk" function 315, the "initialize_tape_drive" function 320, and the "read_from_tape_drive" function 330. That is, the process of testing the "write_to_tape_drive" function 325 may rely on or use other code paths, such as the "read_data_from_disk" function 315. In some embodiments, intentional errors or mutations may be embedded into the source code 305 for one or more functions, such as altering the "read_data_from_disk" function 315 to read corrupted or incomplete data or even disabling the "read_data_from_disk" function 315. When executing the test code 310, the test case may fail, or other functions within the code base may be compromised (e.g., the output of these functions may include errors) due to the intentional modifications. For example, the "setup" function 335 invokes the "read_data_from_disk" function 315 to retrieve data meant to be written into the tape drive. When the "read_data_from_disk" function 315 are mutated to be disabled, the test case fails. This indicates that the "read_data_from_disk" function is implicitly driven by the test case.

As another example, consider if the "read_data_from_disk" function is mutated to retrieve corrupted or incomplete data. In such a configuration, the test case may still pass, but errors can be introduced into other dependent functions. For example, when the "read_data_from_disk" function returns corrupted or incomplete data, the "setup" function 335 may inadvertently pull the corrupted or incomplete data into the system. The corrupted or incomplete data may then be written to the tape drive during the execution of the main test function 345, which indirectly affects the "write_to_tape_drive" function 325. During the verification step, the test case 310 invokes the "read_from_tape_drive" function 330. As the corrupted or incomplete data from the disk was written to and subsequently read from the tape drive, the test case may pass the verification step. However, this is a false positive since the data is not what the system originally intended. Therefore, when executing the test code 310, an intentional change of the "read_data_from_disk" function 315 may inadvertently introduce errors into the other two associated functions within the source code 305, including the "write_to_tape_drive" function 325 and the "read_from_tape_drive" function 330. Based on the affected functions, the scope of the test case may be determined. The "write_to_tape_drive" function 325, being the primary functionality that the test code 310 aims to validate, represents the explicit sections of code driven by the test case (also referred to in some embodiments as the explicit test coverage). In contrast, although the "read_data_from_disk" function 315 and the "read_from_tape_drive" function 330 are compromised, both of them fall outside the primary intent of the test case. As such, the "read_data_from_disk" function 315 and the "read_from_tape_drive" function 330 may be classified as implicit sections of code that are indirectly driven by the test case (also referred to in some embodiments as the implicit test coverage).

Figure 4:
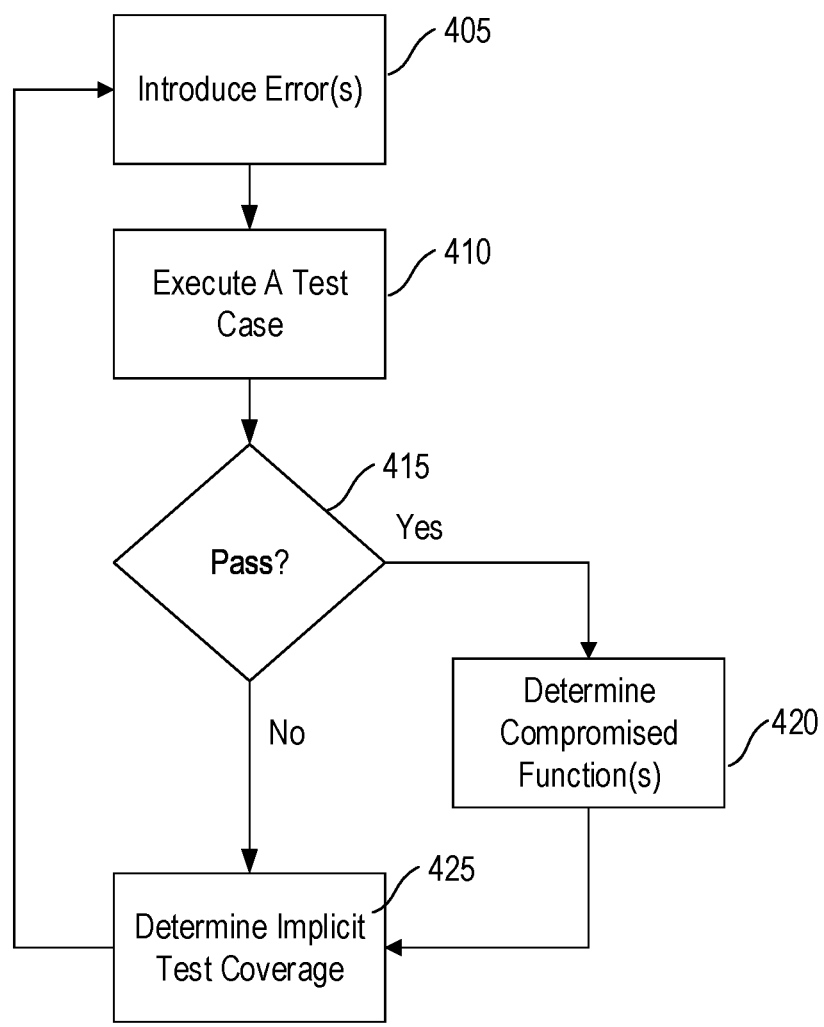
FIG. 4 depicts an example method for detecting implicit test coverage for a test case, according to some embodiments of the present disclosure.
Figure 7:
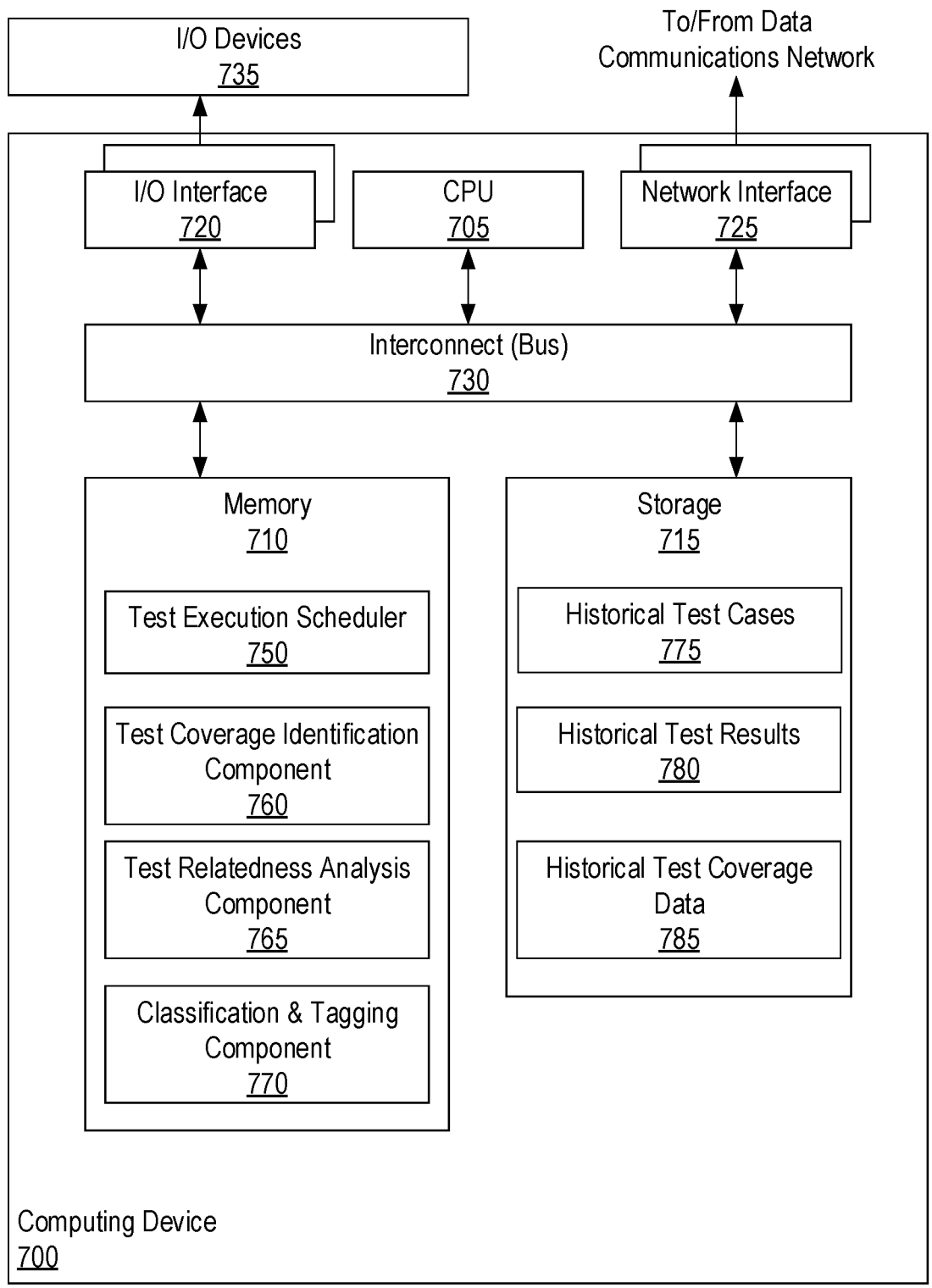
FIG. 7 depicts an example computing device for test management, according to some embodiments of the present disclosure.

FIG. 4 depicts an example method 400 for detecting implicit test coverage for a test case, according to some embodiments of the present disclosure. In some embodiments, the method 500 may be performed by one or more computing devices, such as the computer 101 as illustrated in FIG. 1, the client device 205, the controller 210, the test management device 215, and/or the test server 230 as illustrated in FIG. 2, and/or the computing device 700 as illustrated in FIG. 7.

The method 400 begins at block 405, where a test management device (e.g., 215 of FIG. 2) introduces intentional errors or mutations (e.g., commenting out one or more lines of the function, changing values or assignments, or blocking output) to certain lines of code within the source code. For example, in some embodiments, a test case may be designed to verify the function that writes data into a tape drive. During execution, the test case may invoke a sequence of functions, including a function to read data from a disk (preparation step to obtain the data that needs to be written) (e.g., 315 of FIG. 3), a function to initialize a tape drive (to ensure the tape drive is ready for write/read operations) (e.g., 320 of FIG. 3), a primary function to write data into the tape drive (which is the main functionality to be tested) (e.g., 325 of FIG. 3), and finally a function to read the data back from the tape drive (to verify the correctness of the data written) (e.g., 330 of FIG. 3). The intentional errors or mutations may be introduced into one of these functions. In some embodiments, the errors or mutations may be introduced into functions (or sections of code within these functions) that are not the test case is designed to examine. For example, in the above referenced configuration, the intentional errors or mutations may be introduced into one of these non-primary functions, such as the function to read data from a disk (e.g., 315 of FIG. 3), the function to initialize a tape drive (e.g., 320 of FIG. 3), or the function to read the data back from the tape drive (e.g., 330 of FIG. 3).

In some embodiments, the errors or mutations may be introduced manually. For example, a human tester may selectively select the code to delete or alter. In some embodiments, the errors or mutations may be introduced automatically (or at least with reduced human inputs). For example, the test management device may iteratively evaluate numerous sections of code, and introduce potential mutations or errors systematically.

At block 410, the test management device executes the first test case (e.g., on a remote test server) against the modified source code, and observes whether the test case still passes.

At block 415, the test management device evaluates the test results to determine whether the test case passes or fails after intentional errors or mutations have been introduced. If the test case does not pass, it may suggest that the modified function (or at least the modified sections of code within that function) are implicitly driven by the test case (falling within the test case's implicit coverage). The method 400 then moves to block 425, where the test management device determines that the modified function (or at least the modified sections of code within that function) falls within the test case's implicit coverage. If the test case still passes, it does not necessarily mean that the outcome is correct. For example, when the function to read data from a disk is intentionally mutated to retrieve corrupted or incomplete data. In such a configuration, a test case designed to verify the function that writes data into a tape drive may still pass, but with incorrect results. The method 400 then moves to block 420, where the test management device analyzes the test results and/or associated log files to determine if any components, functions, modules, or specific lines of code have been adversely affected due to these modifications (e.g., intentionally injected errors or mutations). In the above referenced example, the function to read data from a disk, when invoked by the test case, reads corrupted or incomplete data into the system, and therefore is compromised. Additionally, the function to read data from a tape drive is also compromised because it generates a false positive result when invoked by the test case during the verification process. Based on the analysis, the method 400 moves to block 425, where the test management device determines that the compromised functions (or at least sections of code within these functions) fall under the implicit coverage of the test case. In the above referenced configuration, the function to read data from a disk and the function to read data from a tape drive may be determined as implicitly driven by the test case, and therefore fall within the test case's implicit coverage. In some embodiments, even though the test case appears to run successfully and shows no evidence errors in the test results, associated log files may capture inadvertent failures or inconsistencies (e.g., the log files may reveal unusually long execution times or high memory usage, etc.) during the execution of the test case. In such configurations, the test management device may analyze these failures or inconsistencies to ascertain an implicit relationship between the test case and certain components within the source code.

After the implicit coverage of the current test case has been determined at block 425, the method 400 returns to block 405, which represents that the identification process may be repeated for any number of code sections, and/or any number of test cases to determine their respective implicit coverage.

In some embodiments, the implicit test coverage may define an association between the test case (e.g., 310 of FIG. 3) and the segments of source code that are implicitly driven by the test case (e.g., the function to read data from a disk) (e.g., 315 of FIG. 3). When changes are introduced within one of these code segments, a testing system may inspect all related test cases (e.g., those that either explicitly or implicitly drive the modified source code segment) to determine whether any modifications in the source code apply to these related test cases.

Figure 5:
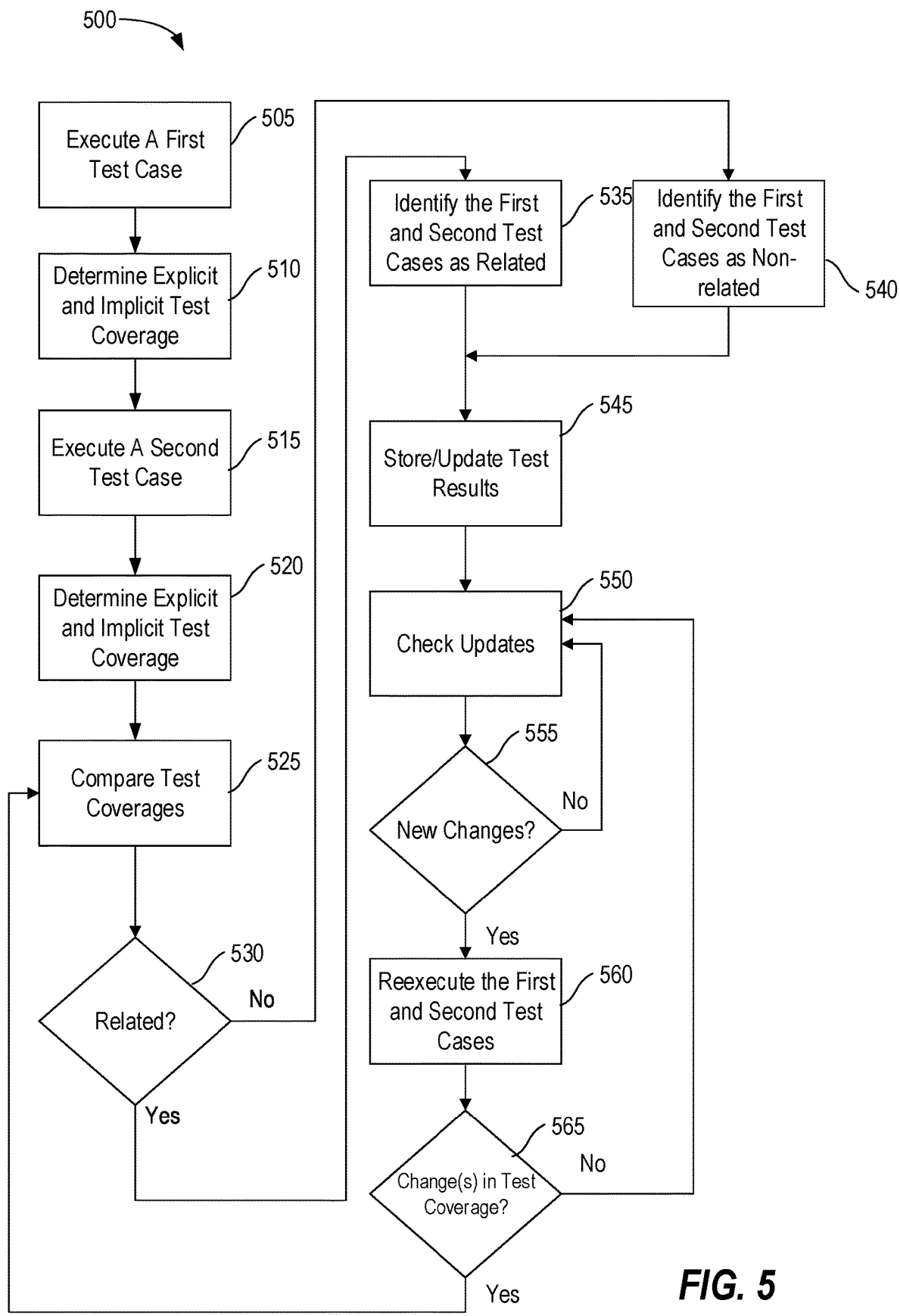
FIG. 5 depicts an example method for detecting related test cases, according to some embodiments of the present disclosure.

FIG. 5 depicts an example method 500 for detecting related test cases, according to some embodiments of the present disclosure. In some embodiments, the method 500 may be performed by one or more computing devices, such as the computer 101 as illustrated in FIG. 1, the client device 205, the controller 210, the test management device 215, and/or the test server 230 as illustrated in FIG. 2, and/or the computing device 700 as illustrated in FIG. 7.

The method 500 begins at block 505, where a test management device (e.g., 215 of FIG. 2) runs a first test case (e.g., on a remote test server) against the source code.

At block 510, the test management device determines the explicit and implicit test coverage for the first test case, such as using one or more embodiments depicted in FIG. 4. For example, in some embodiments, the test management device may intentionally inject errors or mutations into certain lines of code within the source code (e.g., intentional errors are embedded into the "read_data_from_disk" function 315 to read corrupted or incomplete data). The test management device may then re-execute the first test case and observe whether the first test case still passes, and/or if other components, modules, functions, or lines of code within the source code are inadvertently affected/compromised (e.g., the "read_data_from_disk" function 315 has been mutated to return corrupted or incomplete data, and the "read_from_tape_drive" function 330 may generate a false positive result) due to the introduced mutations or errors.

In some embodiments, the explicit test coverage may include sections of code that the test case specifically targets to examine. For example, in some embodiments, if the test case is designed to confirm the functionality of writing data into a tape drive (as depicted in FIG. 3), the explicit coverage may include the direct code paths dedicated to this writing operation (e.g., the "write_to_tape_drive" function 325 of FIG. 3). In some embodiments, the implicit test coverage may refer to sections of code within the source code that are incidentally affected (e.g., that fails or generates erroneous outputs) during the execution of the first test case because of these introduced errors, even though these sections of code fall outside the primary objective of the test (e.g., the "read_data_from_disk" function 315, and the "read_from_tape_drive" function 330 of FIG. 3).

At block 515, the test management device runs a second test case against the source code.

At block 520, the test management device determines the explicit and implicit test coverage of the second test case, such as using one or more embodiments depicted in FIG. 4.

At block 525, the test management device compares the explicit and implicit test coverage of the first and second test cases, and/or checks for overlaps in the sections of the source code they drive.

At block 530, the test management device determines, based on the comparison of test coverage, whether the first and second test cases are related. Test cases with a high degree of overlapping in the explicit or implicit test coverage may be considered related. In some embodiments, the system may generate a score to represent the extent of overlap. A higher score may represent a higher overlap in test coverage, and therefore indicate a stronger relationship between the two test cases. In some embodiments, one or more thresholds may be defined, and these thresholds may be compared with the computed relatedness score. If the score meets or exceeds a defined threshold, the method proceeds to block 535, where the test management device system identifies (or labels) the two test cases to be related. Otherwise, if the score falls below the threshold, the method 500 moves to block 540, where the two test cases are determined to be unrelated.

At block 535, the test management device system identifies (or labels) the two test cases as related. The determination of relatedness between various test cases may serve multiple functions within the system testing process. For example, in some embodiments, such as when performing a regression test on a specific segment of source code, it may not be sufficient to only run the primary test case directly associated with that segment of source code. Instead, for a more comprehensive regression test, a testing system may also execute all test cases related to the primary test case. In some embodiments, such as when modifications are made to a primary test case, the testing system may review all its related test cases to determine whether changes in the primary test case necessitate corresponding adjustments in the related ones. Such interdependencies may be overlooked by human testers but are effectively captured by the established relationships of relatedness. In some embodiments, such as when modifications are made to the source code addressed by a primary test case, the testing system may inspect both the source code and the test cases related to the primary test case, to determine if any change introduced in the original source code applies to these related test cases.

At block 545, the test management device stores the identified relation information, along with the test results for the first and second test cases, to a test database (e.g., 220 of FIG. 2). In some embodiments, the test database creates a centralized repository that allows for easy access and management of test cases, test results, and their relationships. In some embodiments, the test management device may categorize the first and second test cases based on the determined relationship and their respective implicit and explicit test coverage. In some embodiments, the test management device may store an indication for each test case, marking its relationship with other test cases. For example, the test management device may label the first and second cases as "related" to provide clarity on the nature of their relationship. In some embodiments, the test management device may generate a visual representation (such as a graph or flowchart) to depict how different test cases are interconnected. Each node within the graph may represent a test case, and the edges between nodes represent the nature (e.g., related) and/or strength of their relationship. In some embodiments, the test management device may group related test cases together. The grouped sets of related test cases may then be saved in local storage or uploaded to a remote database. In some embodiments, the test management device may assign specific labels or tags to test cases based on their explicit and implicit test coverage.

At block 550, the test management device continuously checks for updates or modifications within the source code. In some embodiments, the test management device may monitor the updates by continuously interacting with the source code database (e.g., 225 of FIG. 2) via a network.

At block 555, the test management device evaluates if there have been any new changes or modifications made to the source code. If changes are detected, the method proceeds to block 560. If not, the method 500 returns to block 550, where the test management device continuously monitors for any updates in the code base.

At block 560, due to the identified changes in the source code, the test management device reruns the first and second test cases.

At block 565, based on the testing result, the test management device determines whether there are any changes in the test coverage (explicit or implicit) for these test case. If no change in test coverage is detected, the method 500 returns to block 550, where the test management device continues to monitor for any updates in the source code. If any change in test coverage has been observed for either the first or second test case, the method 500 proceeds to block 525, where the test management device re-computes the overlap between the test coverage (explicit or implicit) of the two test cases in light of the updated source code, and compares the overlap with one or more defined related thresholds. The iterative process may be used to ascertain whether the relationship between the two test cases has changed after the source code updates. If it is determined that the original relationship between the two test cases no longer exists or has evolved (e.g., the two cases are determined to be related pre-update but non-related post-update), the test management device updates the relationship status between the two test cases in the test database (e.g., 220 of FIG. 2). In some embodiments, the updated relationship information may be utilized to optimize test strategies. For example, in some embodiments, utilizing the up-to-date relationships between test cases, the test management device may reduce redundancy in testing, and/or implement test cases (automatically or at least with reduced human inputs) to test important functionalities of a software system both effectively and efficiently.

Figure 6:
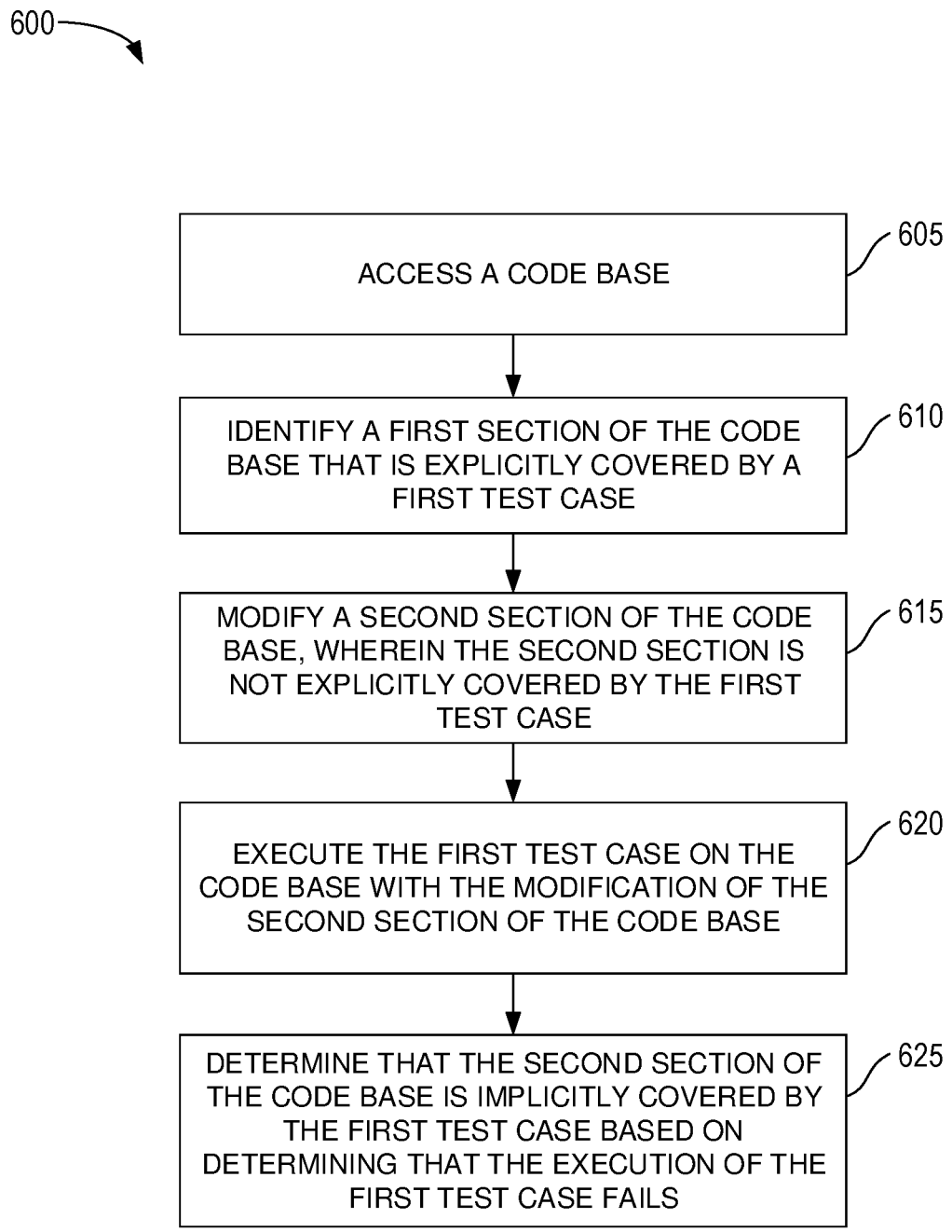
FIG. 6 depicts a flow diagram of an example method for test coverage identification, according to some embodiments of the present disclosure.

FIG. 6 depicts a flow diagram of an example method 600 for test coverage identification, according to some embodiments of the present disclosure.

The method 600 begins at block 605, where a test management device (e.g., 101 of FIG. 1, or 215 of FIG. 2) accesses a code base (e.g., 305 of FIG. 2).

At block 610, the test management device identifies a first section of the code base (e.g., the "write_to_tape_drive" function 325 of FIG. 3) that is explicitly covered by a first test case (e.g., 310 of FIG. 3). In some embodiments, the first section of the code base may be written for functionalities that the first test case was designed to verify.

At block 615, the test management device modifies a second section of the code base (e.g., the "read_data_from_disk" function 315 of FIG. 3), wherein the second section is not explicitly covered by the first test case (as depicted at block 405 of FIG. 4). In some embodiments, the second section of the code base may be written for functionalities that the first test case was not specifically designed to verify.

At block 620, the test management device executes the first test case on the code base with the modification of the second section of the code base (as depicted at block 410 of FIG. 4).

At block 625, the test management device determines that the second section of the code base is implicitly covered by the first test case based on determining that the execution of the first test case fails (as depicted by block 425 of FIG. 4). In some embodiments, the test management device may further store an indication that the second section of the code base is implicitly covered by the first test case. In some embodiment, the test management device may further identify a third section of the code base, where the third section is not explicitly covered by the first test case, and determine that the third section of the code base is implicitly covered by the first test case based on detecting one or more errors within an output of the third section of the code base during the execution of the first test case (as depicted by block 420 of FIG. 4). In some embodiment, the test management device may further compute overlap between sections of the code base covered by the first test case and sections of the code base covered by a second test case, where the sections of the code base covered by the first test case includes the first, second and third sections of the code base, and, upon determining that one or more relatedness criteria are satisfied based on the computed overlap, determine that the first and second test cases are related (as depicted by block 535 of FIG. 5). In some embodiments, the sections of the code base covered by the second test case may be determined based on identifying a fourth section of the code base that is explicitly covered by the second test case, modifying a fifth section of the code base, wherein the fourth section is not explicitly covered by the second test case, executing the second test case on the code base with the modification of the fifth section of the code base, and determining that the fifth section of the code base is implicitly covered by the second test case based on determining that the execution of the second test case fails, where the sections of the code base covered by the second test case includes the fourth and fifth sections of the code base. In some embodiment, the test management device may further categorize the first and second test cases based on the computed overlap (as depicted by block 545 of FIG. 5). In some embodiment, the test management device may further detect a plurality of changes within the code base (as depicted at block 550 of FIG. 5), execute the first and second test cases against the code base with the plurality of changes (as depicted by block 560 of FIG. 5), compute an updated overlap between sections of the code base covered by the first test case and sections of the code base covered by the second test case, and, upon determining that the one or more relatedness criteria are satisfied based on the updated overlap, determine that the first and second test cases remain related.

In some embodiments, the method 600 may further comprise executing a second test case in the system to be tested (as depicted at block 515 of FIG. 5), identifying explicit and implicit test coverage of the second test case (as depicted at block 520 of FIG. 5), computing overlap between the explicit and implicit test coverage of the first test case and the explicit and implicit test coverage of the second test case (as depicted at block 525 of FIG. 5), and upon determining that one or more relatedness criteria are satisfied based on the computed overlap, determining that the first and second test cases are related (as depicted at block 535 of FIG. 5). In some embodiments, the method 600 may further comprise categorizing the first and second test cases based on the computed overlap. In some embodiments, the method 600 may further comprise detecting a plurality of changes within the code base (as depicted at block 555 of FIG. 5), executing the first and second test cases against the code base with the plurality of changes (as depicted at block 560 of FIG. 5), computing an updated overlap between the explicit and implicit test coverage of the first test case and the explicit and implicit test coverage of the second test case, and upon determining that the one or more relatedness criteria are satisfied based on the updated overlap, determining that the first and second test cases remain related (as depicted at block 535 of FIG. 5).

FIG. 7 depicts an example computing device 700 for test management, according to some embodiments of the present disclosure. Although depicted as a physical device, in some embodiments, the computing device 700 may be implemented using virtual device(s), and/or across a number of devices (e.g., in a cloud environment). The computing device 700 can be embodied as any computing device, such as the computer 101 as illustrated in FIG. 1, the client device 205, the controller 210, the test management device 215, and/or the test server 230 as illustrated in FIG. 2.

As illustrated, the computing device 700 includes a CPU 705, memory 710, storage 715, one or more network interfaces 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a test execution scheduler 750, a test coverage identification component 760, a test relatedness analysis component 765, and a categorization & tagging component 770. Although depicted as a discrete component for conceptual clarity, in some embodiments, the operations of the depicted component (and others not illustrated) may be combined or distributed across any number of components. Further, although depicted as software residing in memory 710, in some embodiments, the operations of the depicted components (and others not illustrated) may be implemented using hardware, software, or a combination of hardware and software.

In one embodiment, the test execution scheduler 750 may schedule test case executions based on a variety of criteria, such as time-based scheduling, or event-based scheduling. Under time-based scheduling, the test execution scheduler may initiate test runs at predefined time intervals, such as daily, weekly, or monthly. When utilizing even-based scheduling, the test execution scheduler may set up the test execution in response to specific events, such as the detection of updates in the source code. The systematic execution of test cases, following either time-based or event-based scheduling rules, may be used to determine whether those test case remain applicable to the current version of the source code, or should be updated to reflect changes in the source code.

In one embodiment, the test coverage identification component 760 may determine the explicit and implicit test coverage for a test case. For example, in some embodiments, the test coverage identification component 760 may inject intentional and controlled errors or mutations into the source code. The test coverage identification component 760 may then monitor and analyze which parts of code (or code paths)

were executed during the test case run. Based on the code paths executed, the test coverage identification component 760 may determine both the explicit test coverage (e.g., including components, modules, and/or lines of code that the test case is specifically designed to run), and implicit test coverage (e.g., including components, modules, and/or lines of code that are not the main functionalities the test is designed to verify, but get executed incidentally and compromised due to these intentional errors). In some embodiments, the test coverage identification component 760 may generate detailed reports about the determined coverage for each test case. In some embodiments, the test coverage identification component 760 may save the test coverage data into local storage (e.g., storage 715) or a remote database (e.g., 220 of FIG. 2) and track changes in coverage over time or across different test runs.

In one embodiment, the test relatedness analysis component 765 may analyze the explicit and implicit test coverage of different test cases to determine the extent of overlap. In some embodiments, to compute the overlap, the test relatedness analysis component 765 may compare the sections of code that are exercised by different test cases. Based on the overlap and coverage data, the test relatedness analysis component 765 may determine the relatedness relationship between different test cases. For example, in some embodiments, the test relatedness analysis component 765 may use a numerical value or score to represent the degree of relatedness between test cases. The numerical value or score may be determined based on the overlapping coverage between different test cases. The test relatedness analysis component 765 may define one or more thresholds. If the relatedness score between two test cases meets or surpasses a certain threshold, the two test case may be marked (e.g., by the categorization & tagging component 770) as related.

In one embodiment, the classification & tagging component 770 may classify the test cases based on the determined relatedness relationships. In some embodiments, based on the determined relationships, the classification & tagging component 770 may generate a visual representation (such as a graph or flowchart) to depict how different test cases are interconnected. In some embodiments, the classification & tagging component 770 may attach labels or tags to test cases based on their explicit and implicit test coverage. For example, a test case that is designed to verify the "write to tape drive" function but implicitly drives the code for the functions to "read data from a disk" and "read data from a tape drive." The classification & tagging component 770 may attach tags such as "explicit-write-to-tape," "implicit-read-from-disk," "implicit-read-from-tape." These tags may provide a more detailed view of the scope and reach of each test case. In some embodiments, when multiple test cases are determined to be related, the classification & tagging component 770 may mark these cases as "related." The classification & tagging component 770 may group these test cases together, and/or instruct to save the grouped set of related test cases in local storage or a remote database.

In the illustrated example, the storage 715 may include historical test cases 775, historical test results 780, and historical test coverage data 785. In some embodiments, the aforementioned information may be saved in a remote database (e.g., test database 220 of FIG. 2) that connects to the computing device 700 via a network (e.g., 235 of FIG. 2).

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
accessing a code base;
identifying a first section of the code base that is explicitly covered by a first test case;
modifying a second section of the code base to introduce one or more intentional disruptions, wherein the second section is not explicitly covered by the first test case;
executing the first test case on the code base with the modification of the second section of the code base; and
determining that the second section of the code base is implicitly covered by the first test case based on determining that the execution of the first test case fails.

2. The method of claim 1, wherein the first section of the code base is written for functionalities that the first test case was designed to verify.

3. The method of claim 1, wherein the second section of the code base is written for functionalities that the first test case was not specifically designed to verify.

4. The method of claim 1, further comprising storing an indication that the second section of the code base is implicitly covered by the first test case.

5. The method of claim 1, further comprising:
identifying a third section of the code base, wherein the third section is not explicitly covered by the first test case; and
determining that the third section of the code base is implicitly covered by the first test case based on detecting one or more errors within an output of the third section of the code base during the execution of the first test case.

6. The method of claim 5, further comprising:
computing overlap between sections of the code base covered by the first test case and sections of the code base covered by a second test case, wherein the sections of the code base covered by the first test case includes the first, second and third sections of the code base; and
upon determining that one or more relatedness criteria are satisfied based on the computed overlap, determining that the first and second test cases are related.

7. The method of claim 6, the sections of the code base covered by the second test case are determined based on:
identifying a fourth section of the code base that is explicitly covered by the second test case;
modifying a fifth section of the code base, wherein the fourth section is not explicitly covered by the second test case;
executing the second test case on the code base with the modification of the fifth section of the code base; and
determining that the fifth section of the code base is implicitly covered by the second test case based on determining that the execution of the second test case fails, wherein the sections of the code base covered by the second test case includes the fourth and fifth sections of the code base.

8. The method of claim 7, further comprising categorizing the first and second test cases based on the computed overlap.

9. The method of claim 7, further comprising:
detecting a plurality of changes within the code base;
executing the first and second test cases against the code base with the plurality of changes;
computing an updated overlap between sections of the code base covered by the first test case and sections of the code base covered by the second test case; and
upon determining that the one or more relatedness criteria are satisfied based on the updated overlap, determining that the first and second test cases remain related.

10. A system comprising:
one or more memories collectively storing computer-executable instructions; and
one or more processors configured to collectively execute the computer-executable instructions and cause the system to:
access a code base;
identify a first section of the code base that is explicitly covered by a first test case;
modify a second section of the code base to introduce one or more intentional disruptions, wherein the second section is not explicitly covered by the first test case;
execute the first test case on the code base with the modification of the second section of the code base; and
determine that the second section of the code base is implicitly covered by the first test case based on determining that the execution of the first test case fails.

11. The system of claim 10, wherein the first section of the code base is written for functionalities that the first test case was designed to verify.

12. The system of claim 10, wherein the second section of the code base is written for functionalities that the first test case was not specifically designed to verify.

13. The system of claim 10, wherein the computer-executable instructions are executed by the one or more processors and cause the system to further:
identify a third section of the code base, wherein the third section is not explicitly covered by the first test case; and
determine that the third section of the code base is implicitly covered by the first test case based on detecting one or more errors within an output of the third section of the code base during the execution of the first test case.

14. The system of claim 13, wherein the computer-executable instructions are executed by the one or more processors and cause the system to further:
compute overlap between sections of the code base covered by the first test case and sections of the code base covered by a second test case, wherein the sections of the code base covered by the first test case includes the first, second and third sections of the code base; and
upon determining that one or more relatedness criteria are satisfied based on the computed overlap, determine that the first and second test cases are related.

15. The system of claim 14, wherein the computer-executable instructions are executed by the one or more processors and cause the system to further categorize the first and second test cases based on the computed overlap.

16. The system of claim 14, wherein the computer-executable instructions are executed by the one or more processors and cause the system to further:
detect a plurality of changes within the code base;
execute the first and second test cases against the code base with the plurality of changes;

compute an updated overlap between sections of the code base covered by the first test case and sections of the code base covered by the second test case; and upon determining that the one or more relatedness criteria are satisfied based on the updated overlap, determine that the first and second test cases remain related.

17. A computer program product, comprising:
a computer-readable storage medium having computer-readable program code executable to cause the computer program product to:

access a code base;
identify a first section of the code base that is explicitly covered by a first test case;
modify a second section of the code base to introduce one or more intentional disruptions, wherein the second section is not explicitly covered by the first test case;
execute the first test case on the code base with the modification of the second section of the code base; and
determine that the second section of the code base is implicitly covered by the first test case based on determining that the execution of the first test case fails; and
one or more processors, each processor of which is configured to execute at least a respective portion of the computer-readable program code.

18. The computer program product of claim 17, wherein the first section of the code base is written for functionalities that the first test case was designed to verify.

19. The computer program product of claim 17, wherein the computer-readable storage medium having computer-readable program code executable to cause the computer program product to further:
compute overlap between sections of the code base covered by the first test case and sections of the code base covered by a second test case, wherein the sections of the code base covered by the first test case includes the first and second sections of the code base; and
upon determining that one or more relatedness criteria are satisfied based on the computed overlap, determine that the first and second test cases are related.

20. The computer program product of claim 19, wherein the computer-readable storage medium having computer-readable program code executable to cause the computer program product to further:
detect a plurality of changes within the code base;
execute the first and second test cases against the code base with the plurality of changes;
compute an updated overlap between sections of the code base covered by the first test case and sections of the code base covered by the second test case; and
upon determining that the one or more relatedness criteria are satisfied based on the updated overlap, determine that the first and second test cases remain related.

\* \* \* \* \*